(12) United States Patent
Kuhm et al.

(10) Patent No.: US 9,270,100 B2
(45) Date of Patent: Feb. 23, 2016

(54) FASTENING CLIP

(71) Applicant: TRW Automotive Electronics & Components GmbH, Radolfzell (DE)

(72) Inventors: Michel Kuhm, Ingwiller (FR); Emmanuel Ouine, Bischwiller (FR)

(73) Assignee: TRW Automotive Electronics & Components GmbH (DE)

( * ) Notice: Subject to any disclaimer, the term of this patent is extended or adjusted under 35 U.S.C. 154(b) by 0 days.

(21) Appl. No.: 14/283,277

(22) Filed: May 21, 2014

(65) Prior Publication Data

US 2015/0014489 A1     Jan. 15, 2015

(30) Foreign Application Priority Data

Jun. 6, 2013  (FR) ...................................... 13 55195

(51) Int. Cl.
| | | |
|---|---|---|
| *F16L 3/08* | (2006.01) | |
| *H02G 3/32* | (2006.01) | |
| *B60R 16/02* | (2006.01) | |
| *F16L 3/13* | (2006.01) | |
| *H01R 9/24* | (2006.01) | |
| *H01R 13/58* | (2006.01) | |

(52) U.S. Cl.
CPC .............. *H02G 3/32* (2013.01); *B60R 16/0215* (2013.01); *F16L 3/085* (2013.01); *F16L 3/13* (2013.01); *H01R 9/2416* (2013.01); *H01R 13/5804* (2013.01)

(58) Field of Classification Search
CPC ........ F16L 3/13; F16L 3/085; B60R 16/0215; H02G 3/32; H01R 9/2416; H01R 13/5804
USPC ........ 248/70, 74.2, 274.1, 65, 222.52, 49, 58, 248/60, 63, 68.1, 220.21, 220.22, 309.1
See application file for complete search history.

(56) References Cited

U.S. PATENT DOCUMENTS

| | | | | |
|---|---|---|---|---|
| 5,271,587 | A * | 12/1993 | Schaty ..................... | H02G 3/26 248/68.1 |
| 5,460,342 | A * | 10/1995 | Dore .................... | B60R 16/0215 248/68.1 |
| 6,216,986 | B1 * | 4/2001 | Kwilosz .................... | F16L 3/13 248/73 |
| 6,216,987 | B1 | 4/2001 | Fukuo | |
| 2010/0127135 | A1 * | 5/2010 | Stocker ..................... | F16L 3/18 248/70 |
| 2012/0004659 | A1 | 1/2012 | Miller et al. | |
| 2013/0146720 | A1 * | 6/2013 | Meyers ............... | B60R 16/0215 248/68.1 |
| 2014/0061413 | A1 * | 3/2014 | Bradfield ............. | G10D 13/003 248/229.1 |

FOREIGN PATENT DOCUMENTS

| | | |
|---|---|---|
| EP | 1 101 988 | 5/2001 |
| FR | 2 491 165 | 9/1980 |
| FR | 2 765 280 | 12/1998 |

* cited by examiner

*Primary Examiner* — Todd M Epps
(74) *Attorney, Agent, or Firm* — Tarolli, Sundheim, Covell & Tummino LLP

(57) ABSTRACT

A fastening clip comprises a base body and at least one holding portion which is integrally but flexibly connected to the base body, the base body as well as the holding portion comprising at least one receptacle for an elongated member. The holding portion is reversibly movable with respect to the base body in a predefined range, however, a rotation of the holding portion relative to the base body is limited by first stops.

8 Claims, 4 Drawing Sheets

FASTENING CLIP

FIELD OF THE INVENTION

The invention relates to a fastening clip.

BACKGROUND OF THE INVENTION

Fastening clips are used, for instance, in vehicles in order to position and fix cables of the vehicular electric system relative to one another or to arrest cables on the vehicle body. In many cases, the cables extend at an angle relative to one another so that fastening clips have been developed which comprise two cable mounts that can be rotated relative to each other. The rotatability is achieved, for instance, in that two separate cable mounts are connected to each other so as to be rotatable. The separate production and subsequent assembly of the two cable holders increases the manufacturing expense and hence increases the price of the member.

EP 1 101 988 A2 shows a fastening clip having two portions with one receptacle each, the portions being connected by a flexible web with a rectangular cross-section. To limit a bending movement of the web, two supporting plates are provided that serve as stops.

SUMMARY OF THE INVENTION

It is an object of the invention to provide a flexibly usable fastening clip which can be manufactured in a simple and low-cost manner.

This is achieved with a fastening clip comprising a base body and at least one holding portion which is integrally but flexibly connected to the base body, the base body as well as the holding portion comprising at least one receptacle for an elongated member and the holding portion being rotation of the holding portion relative to the base body is limited by first stops. As the holding portion is flexibly connected to the base body, a range of movement between the base body and the holding portion is created, on the one hand, so that the fastening clip can be adapted to most diverse installation situations. On the other hand, the fastening clip can be produced in one piece and preferably as an off-tool part, reducing the number of the processing steps and hence lowering the manufacturing costs. If desired, the flexibility can be realized in all three directions in space.

The first stops may be part of a stop arrangement on the base body and/or on the holding portion, the stop arrangement comprising stops which limit a movement of the holding portion relative to the base body. Preferably, these stops also limit a movement of the flexible elements so that the flexible elements are prevented in a simple manner from undergoing an excessively large deflection or rotation or experiencing an excessively high force.

These stops, but even the entire stop arrangement, may be arranged in the region of the flexible elements.

The fastening clip preferably serves for fastening cables which can be inserted in the receptacles, but it may also be used e.g. for lines or pipes. The fastening clip may be designed such that it can be connected with the chassis, but it may also be designed such that it may be installed so as to be self-supporting.

It is preferred that the holding portion can be rotated with respect to the base body by a predetermined angle to account for different orientations of the members to be fastened.

When being deflected, the flexible elements are also able to produce a restoring force into the neutral position.

The integral and flexible connection between the holding portion and the base body may be achieved in particular in that the holding portion is connected to the base body through at least one flexible element which is integrally connected to the base body and to the holding portion. In this arrangement, the flexible element(s) preferably form(s) the only connection between the base body and the holding portion.

Candidates for the flexible elements are two flexible webs, for instance, which extend between the base body and the holding portion.

The holding portion may comprise an axis of rotation extending approximately perpendicular to the longitudinal extension of the base body. The flexible elements preferably protrude perpendicularly from a protrusion coinciding with the axis of rotation of the holding portion and are preferably formed on the inner edge of an opening in the base body, into which opening the protrusion extends.

The webs of the flexible elements may have an extension perpendicular to the connecting plane between the base body and the holding portion which is larger than the width of the web in this plane, for effecting a stabilization of the holding portion with respect to the base body. Moreover, a sufficiently high restoring force in the flexible elements can be achieved in this way in a simple manner.

In a variant, a stable protrusion is provided on the axis of rotation and comes in contact with the first stops which preferably are formed on the inner edge of the opening in the base body, in particular are molded thereon. The maximum angle of rotation can be predefined via the arrangement of the first stops in a simple manner. This angle may amount to ±30° around a neutral position, for instance. It goes without saying that other angles can also be realized, which may be predefined in asymmetric arrangement around the neutral position.

It is preferred that second stops are provided which limit a displacement of the holding portion relative to the base body. In this way, a limitation of the movement of the base body relative to the holding portion in all directions of space can easily be achieved.

By way of example, the second stops are made of two protrusions on the base body, a protrusion which is formed on the holding portion being disposed between them in the axial direction of the axis of rotation of the holding portion, with the protrusions overlapping as seen in top view. It goes without saying that the arrangement of the second stops on the axis of rotation and on the base body may also be selected so as to be reversed. The axial displacement is limited by the axial distance of the protrusions, while the displacement in the radial direction is limited by the radial distance of the protrusions from the axis of rotation. The swing angle is preferably limited by the first stops as is described above.

In a preferred embodiment, three receptacles are provided on the fastening clip in total, in particular two receptacles being formed on the base body.

The receptacles on the base body may open in different directions; in particular, an offset by 90° can be realized, but also any other angle between the receptacles, for instance 180°.

It is preferred that at least one of the receptacles on the base body comprises a length balancing structure, in particular comprising a spring element projecting into the receptacle. A structure of this type gives the fastening clip a further degree of freedom, namely with respect to the distance of the elongated members to be connected which may vary along the length of the length balancing structure.

DESCRIPTION OF EMBODIMENTS

Figure 1:
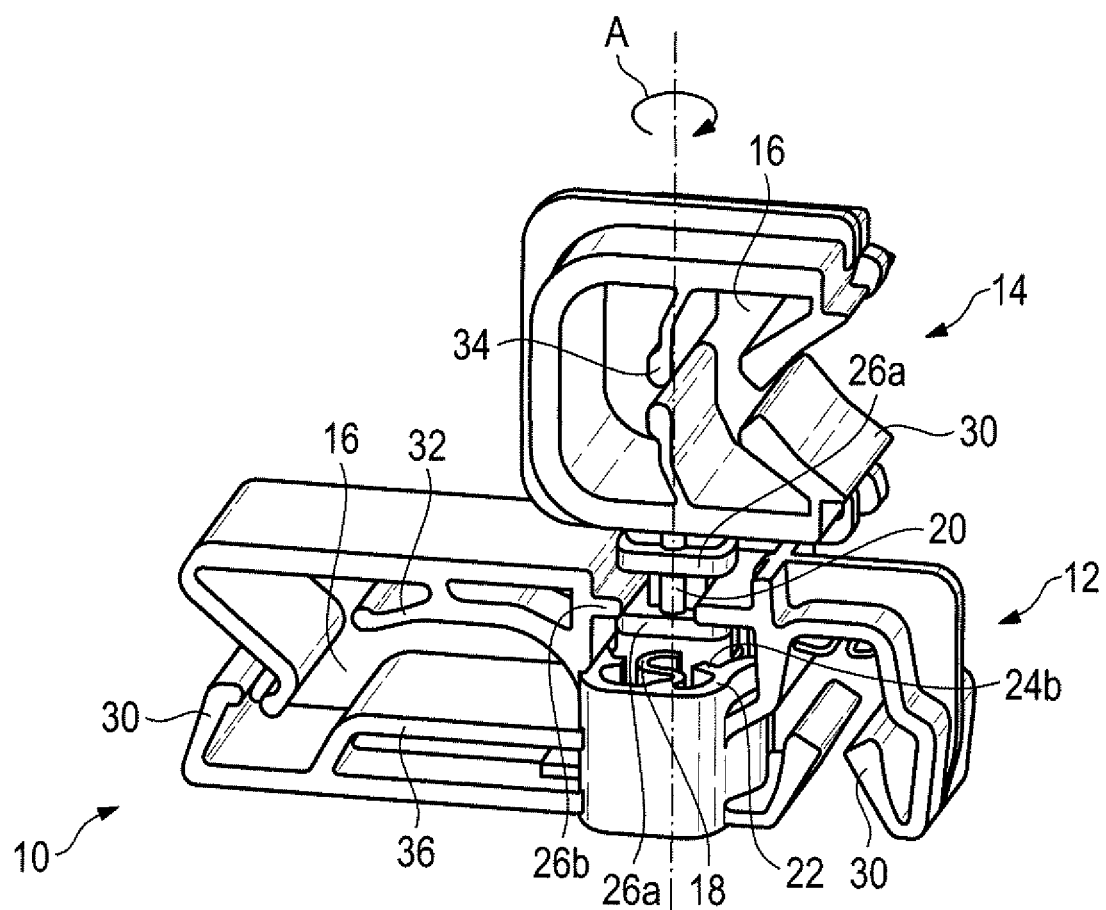
FIG. 1 is a schematic perspective illustration of a fastening clip of the invention according to a first embodiment.

FIG. 1 shows a fastening clip 10 according to a first embodiment. The fastening clip 10 comprises a base body 12 and a holding portion 14.

In this example, the holding portion 14 is provided with one single receptacle 16 for an elongated member, in particular a cable. The base body 12 comprises two receptacles 16 which likewise are designed for elongated members, in particular for cables.

The holding portion 14 has a material connection to the base body 12 so that these two members form a one-piece, contiguous unit.

The connection, however, has such a degree of flexibility that the holding portion 14 is reversibly movable with respect to the base body 12 in a predefined range.

Figure 2:
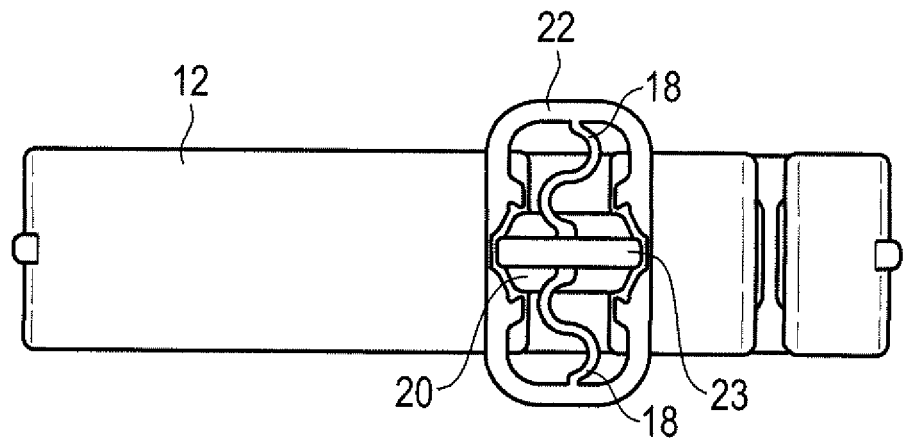
FIGS. 2 and 3 are schematic views of the connection of the base body to the holding portion of the fastening clip of FIG. 1.
Figure 3:
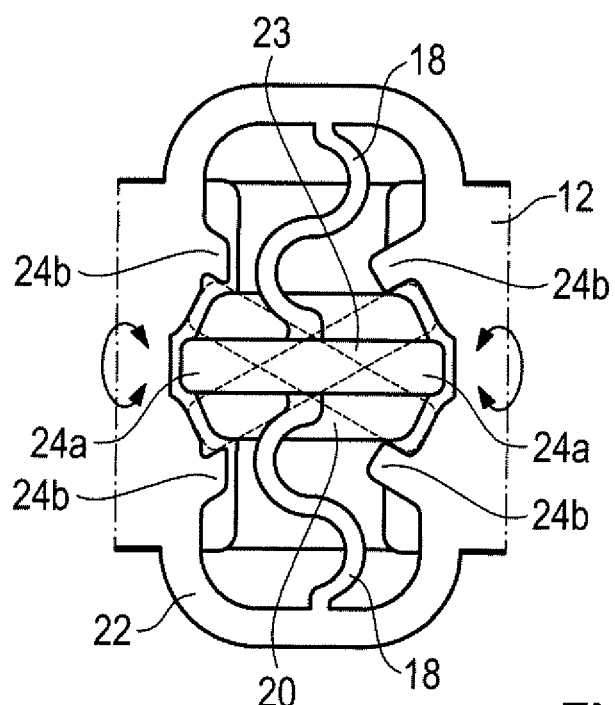

The holding portion 14 is arranged so as to be rotatable with respect to the base body 12 by a predetermined amount around an axis of rotation A. To this end, two flexible elements 18 are provided (see FIGS. 2 and 3) which are designed here in the form of S-shaped and curved plastic webs which in FIG. 2 project into the image plane. On one of their ends, the flexible elements 18 each are integrally connected to a protrusion 20 which is formed on the holding portion 14 and extends along the axis of rotation A. The respectively other end of each of the flexible elements 18 is integrally connected to a frame 22 formed on the base body 12 so that the two flexible elements 18 and the protrusion 20 arranged between them are disposed in the opening in the base body 12 defined by the frame 22. The protrusion 20 extends centrally through the opening defined by the frame 22.

The two flexible elements 18 are integrally connected both to the frame 22 and the protrusion 20. This unit is produced in this example in an injection molding method.

The webs defining the flexible elements 18 are so elastic that they allow a rotation of the protrusion 20 with respect to the frame 22 and hence a rotation of the holding portion 14 with respect to the base body 12. During rotation, a restoring force is produced in the flexible elements 18 which strives to return the holding portion 14 back into the neutral initial position illustrated in FIGS. 2 and 3.

In this case, the length of the flexible elements 18 in the image plane is larger than their width in the image plane so that the flexible elements 18 establish a stable connection between the base body 12 and the holding portion 14; here, the flexible elements 18 also have a stabilizing effect on the holding portion 14 with respect to the base body 12 in terms of tilting motions perpendicular to the axis of rotation A.

A web 23 is formed on the protrusion 20 and extends perpendicular to the axis of rotation A. In this example, the web 23 is provided on the upper end of the flexible elements 18 in the Figures. The two free ends of the web 23 define two opposite first stops 24a. These cooperate with four first stops 24b in total, which project from the inner side of the frame 22 into the opening in the base body 12 (see FIG. 3). The first stops 24a, 24b restrict the maximum swing angle of the holding portion 14 with respect to the base body 12 around the axis of rotation A, as the stops 24a on the web 23 get into abutment on the stops 24b on the frame 22. It is by means of the position of the stops 24a, 24b that the maximum swing angle can be set according to the discretion of the person skilled in the art. In this case, the maximum swing angle is approximately ±30° with respect to the neutral position shown in FIG. 3 (indicated by the maximally deflected positions of the webs 23 in broken lines).

The first stops 24a, 24b are part of a stop arrangement; the second stops 26a, 26b limiting a displacement of the holding portion 14 relative to the base body 12 pertain to said stop arrangement, too. In this example, two second stops 26a in the form of axially superimposed protrusions projecting radially from the protrusion 20 are formed on the protrusion 20 between the flexible elements 18 and the receptacle 16 of the holding portion 14 (see FIGS. 1, 4 and 5).

In this example, two plate-shaped protrusions projecting radially inward towards the axis of rotation A are formed on the base body 12 axially above the frame 22; these plate-shaped protrusions define the corresponding second stops 26b. Due to the interlocking of all second stops 26a, 26b, the stops 26b on the base body 12 will make contact with the stops 26a on the protrusion 20 upon any movement of the holding portion 14 in the axial direction A or in the radial direction. The second stops 26b on the base body 12 could also be formed such that they circumferentially surround the protrusion 20 in its entirety.

The second stops 26a, 26b are arranged so as to engage each other in radial direction. Therefore, it is not possible to lift off the holding portion 14 in the Figures in upward direction from the base body 12 by more than the distance between the second stops 26a, 26b.

In this example, the complete fastening clip 10 including the flexible elements 18, the protrusions 20, the receptacles 16 and the stops 24a, 24b, 26a, 26b is produced in a single injection molding process, possibly in several successive molding steps, so that the fastening clip 10 is manufactured so as to be off-tool.

Furthermore, the holding portion 14 is undetachably connected to the base body 12 through the flexible element 18 and the second stops 26a, 26b.

In this arrangement, the holding portion 14 and the base body 12 are fastened to each other only through the flexible elements 18 which are connected to the frame 22 and the protrusion 20. The connection is already produced in the tool and no further assembly steps are provided after removal from the tool.

Here, all components of the fastening clips 10 are made of the same plastic material. It would also be possible, however, that a different material, for instance a material with a somewhat higher elasticity, is used for e.g. the flexible elements 18.

In the illustrated example, the openings of all three receptacles 16 of the fastening clips 10 have differing orientations. The receptacle 16 of the holding portion 14 points toward the side. One of the receptacles 16 of the base body 12 opens perpendicularly in downward direction, whereas the second receptacle 16 of the base body 12 is aligned in the neutral position by 180° with respect to the opening of the receptacle in the holding portion 14.

The receptacles 16 each have inwardly oriented snap arms 30 allowing the fastening clip 10 to simply be slipped onto the elongated member 28 but at the same time preventing the fastening clip 10 from coming off the elongated member 28 without external influence.

In one of the receptacles 16 of the base body 12, a length balancing structure 32 is provided in addition to the snap arms 30; said length balancing structure comprises a spring element in the form of an arm projecting obliquely into the interior of the receptacle 16 and biasing the elongated member 28 towards the snap arms 30. Upon impact of a force towards the axis of rotation A into the interior of the receptacle 16, the elongated member 28 can move into the receptacle 16 by a certain amount against the resistance of the length balancing structure 32. In this way, the fastening clip 10 may be used for differently spaced elongated members 28.

Figure 4:
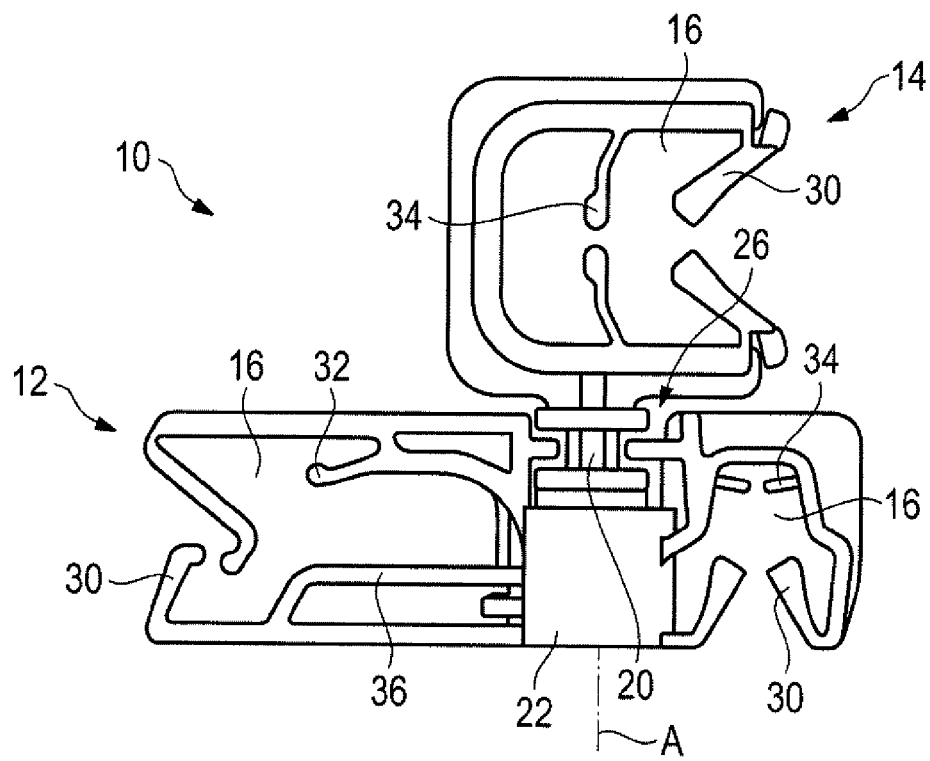
FIG. 4 is a schematic side view of the fastening clip of FIG. 1.
Figure 5:
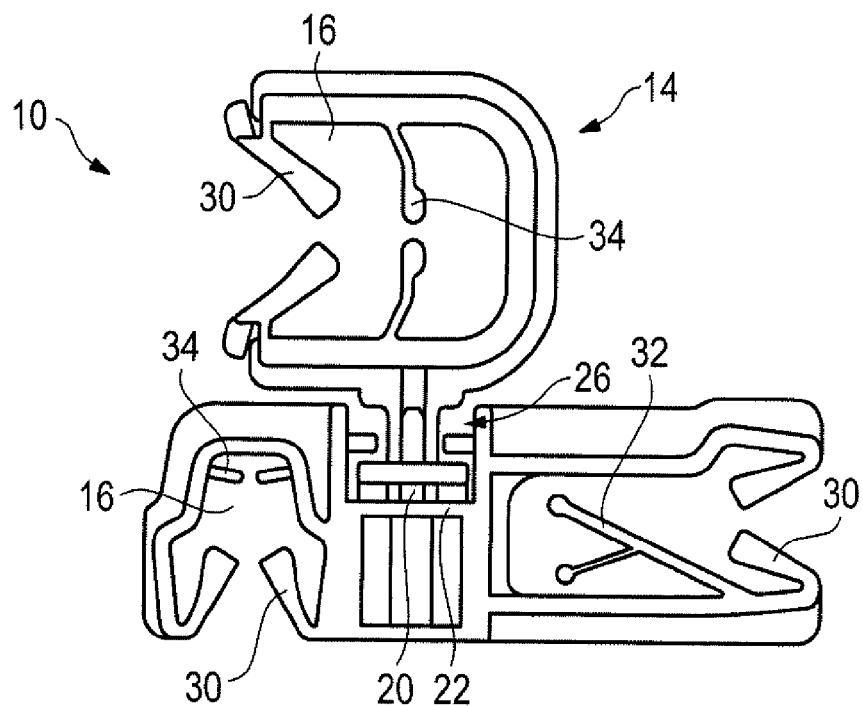
FIG. 5 is a schematic side view of a fastening clip of the invention according to a second embodiment.

In the first embodiment shown in FIGS. 1 and 4, the arm of the length balancing structure 32 in the elongated receptacle 16 (in these Figures shown on the left) is formed so as to be short and projects into the receptacle 16 from above, whereas a guiding ramp 36 is provided opposite the arm.

Figure 6:
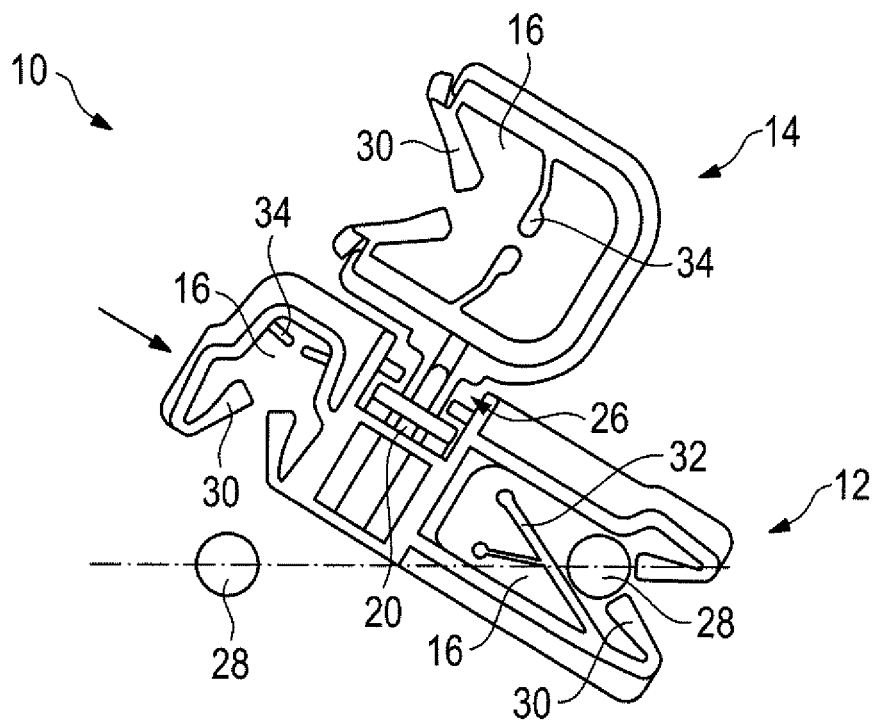
FIGS. 6 and 7 show steps of assembling the fastening clip of FIG. 5 on two elongated members.
Figure 7:
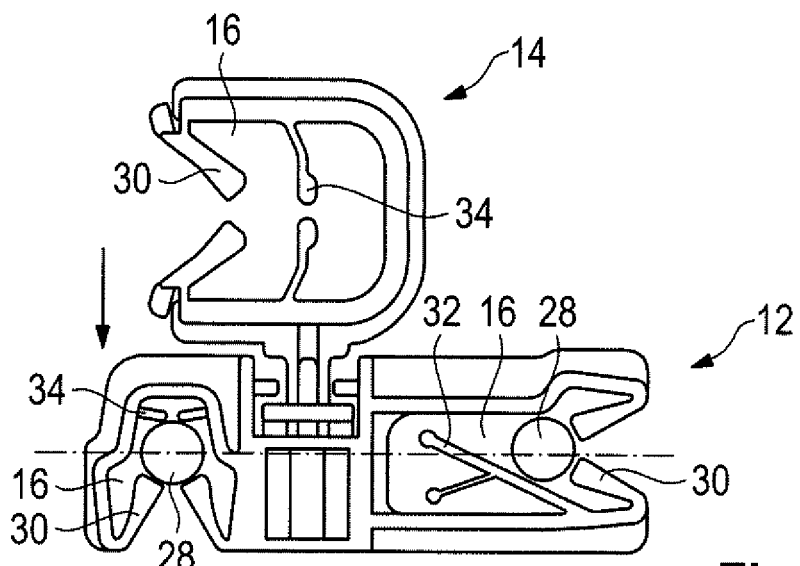

In the second embodiment shown in FIGS. 6 and 7, the length balancing structure 32 is provided in the right-hand side receptacle 16 in the Figures. In this variant, the length balancing structure 32 is a long arm in Y-shaped design which protrudes obliquely into the receptacle 16.

In this example, only this one of the three receptacles 16 is equipped with such a length balancing structure 32. However, it would also be possible to use this type of the receptacle 16 at several places of the fastening clip 10.

In the other two receptacles 16, one spring element 34 each is arranged which biases the elongated member 28 towards the snap arms 30 and in this way holds the fastening clip 10 firmly on the elongated members 28 in a rattle-free manner.

The assembly on e.g. two parallel cables forming elongated members 28 is illustrated in FIGS. 6 and 7. First, the laterally open receptacle 16 of the base body 12 (in FIG. 6 on the right) is slipped over the elongated member 28 until the latter snaps in place behind the inwardly oriented snap arms 30 of the receptacle 16.

Having been attached to the right-hand side elongated member 28 in FIG. 6 (see arrow), the fastening clip 10 has its second receptacle 16 of the base body 12 pressed onto the second elongated member 28 from above so that the latter slides through the snap arms 30 and snaps in place in the receptacle 16 (see FIG. 7).

It is conceivable, of course, that the base body 12 is provided with only one or even more than two receptacles 16; similarly, the holding portion 14 may be provided with more than only one receptacle 16. Instead of or in addition to at least one of the receptacles 16, the fastening clip 10 could also be provided with a fastening means such as a locking element for being connected to the vehicle body, for instance.

The invention claimed is:

1. A fastening clip comprising a base body and at least one holding portion which is integrally but flexibly connected to the base body, the base body as well as the holding portion comprising at least one receptacle for an elongated member and the holding portion being reversibly movable with respect to the base body in a predefined range, first stops being provided which limit a rotation of the holding portion relative to the base body.

2. The fastening clip according to claim 1, wherein the holding portion can be rotated with respect to the base body by a predetermined angle.

3. The fastening clip according to claim 1, wherein the holding portion is connected to the base body through at least one flexible element which is integrally connected to the base body and to the holding portion.

4. The fastening clip according to claim 3, wherein two flexible webs are provided as flexible elements which extend between the base body and the holding portion.

5. The fastening clip according to claim 1, wherein second stops are provided which limit a displacement of the holding portion relative to the base body.

6. The fastening clip according to claim 1, wherein the at least one receptacle comprises two receptacles on the base body and one receptacle on the holding portion.

7. The fastening clip according to claim 1, wherein the at least one receptacle comprises a plurality of receptacles on the base body that open in different directions.

8. The fastening clip according to claim 1, wherein the at least one receptacle comprises a receptacle on the base body, a length balancing structure comprising a spring element projecting into the receptacle on the base body.

* * * * *